United States Patent [19]

Barmatz

[11] Patent Number: 4,475,921
[45] Date of Patent: Oct. 9, 1984

[54] ACOUSTIC AGGLOMERATION METHODS AND APPARATUS

[75] Inventor: Martin B. Barmatz, Glendale, Calif.

[73] Assignee: The United States of America as represented by the Administrator of the National Aeronautics and Space Administration, Washington, D.C.

[21] Appl. No.: 361,217

[22] Filed: Mar. 24, 1982

[51] Int. Cl.³ .............................................. C05B 19/00
[52] U.S. Cl. .................................... 23/313 R; 55/15; 55/277
[58] Field of Search ............................ 55/15, 277, 97; 210/748; 366/127; 23/313 R

[56] References Cited

U.S. PATENT DOCUMENTS

| | | | |
|---|---|---|---|
| 2,215,484 | 9/1940 | St. Clair | 55/15 |
| 2,216,779 | 10/1940 | Houghton et al. | 55/15 |
| 2,300,761 | 11/1942 | Amy | 55/15 |
| 3,771,286 | 11/1973 | Scott | 55/15 |
| 4,235,606 | 11/1980 | Becker et al. | 55/277 |
| 4,307,964 | 12/1981 | Dudgeon et al. | 55/277 |
| 4,339,247 | 7/1982 | Faulkner | 55/15 |

FOREIGN PATENT DOCUMENTS 780986  8/1957  United Kingdom ................. 55/277

Primary Examiner—Bernard Nozick
Attorney, Agent, or Firm—Paul F. McCaul; Thomas H. Jones; John R. Manning

[57] ABSTRACT

Methods are described for using acoustic energy to agglomerate fine particles on the order of one micron diameter that are suspended in gas, to provide agglomerates large enough for efficient removal by other techniques. The gas with suspended particles, is passed through the length of a chamber (24) while acoustic energy at a resonant chamber mode is applied to set up one or more acoustic standing wave patterns (40,42,44) that vibrate the suspended particles to bring them together so they agglomerate. Several widely different frequencies can be applied to efficiently vibrate particles of widely differing sizes. The standing wave pattern can be applied along directions (R in FIG. 3) transversed to the flow of the gas. The particles can be made to move in circles by applying acoustic energy in perpendicular directions (P,Q in FIG. 6) with the energy in both directions being of the same wavelength but 90° out of phase.

4 Claims, 8 Drawing Figures

ACOUSTIC AGGLOMERATION METHODS AND APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The removal of fine particles from a gas, is required in a large number of applications, such as in the removal of particulate contaminants from the exhausts of power sources. Several devices such as cyclones, venturi scrubbers, and fabric filters, can efficiently remove larger particles such as those above about 5 micron diameter. However, devices are not available for efficiently removing smaller particles.

Fine particles can be removed by using acoustic energy to vibrate particles to bring them close to one another so they stick together. Such acoustic agglomeration is a proven process for removal of fine particles, but previous attempts have not been cost effective. Most attempts have involved the application of acoustic energy of frequencies that produce large particle vibrations, but without regard to the dimensions of the pipe or chamber in which the gas was moving, so that large amounts of energy were required to produce only moderately intense acoustic fields. Another system, described in U.S. Pat. No. 2,215,484 by St. Clair, uses a technique wherein particle-ladden gas passes along the length of a chamber while a sound wave resonant to the length of the chamber is applied, to cause particles to agglomerate at the locations of minimum pressure of the standing wave pattern, in the manner of the well known Kundt dust-tube experiment. This technique will not simultaneously agglomerate particles of a wide range of sizes, which is a disadvantage because a wide range of fine particles sizes are encountered in many applications.

SUMMARY OF THE INVENTION

In accordance with one embodiment of the present invention, a method and apparatus are provided for acoustically agglomerating fine particles suspended in a gas, which is of high efficiency for particles of a range of sizes. The system includes a chamber through which the gas with entrained particles flows, and a sonic generator coupled to the chamber to apply acoustic energy resonant to the chamber. The acoustic energy vibrates particles to cause them to move against one another so they stick together, or agglomerate, to form larger particles that can be efficiently removed from the gas by other particle separators.

Resonant acoustic energy of two or more different frequencies can be applied simultaneously to the chamber to more efficiently agglomerate particles of widely differing sizes, the lower frequencies being more efficient for vibrating larger particles and the higher frequencies being more efficient for smaller particles. The acoustic energy can be directed transverse to the flow of gas through the chamber. In one system, first and second acoustic waves of the same wavelength are applied in perpendicular directions to the chamber. The two acoustic waves are 90° out of phase, to cause particles to move in circles or helixes to enhance their motion and therefore to provide more effective agglomeration.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
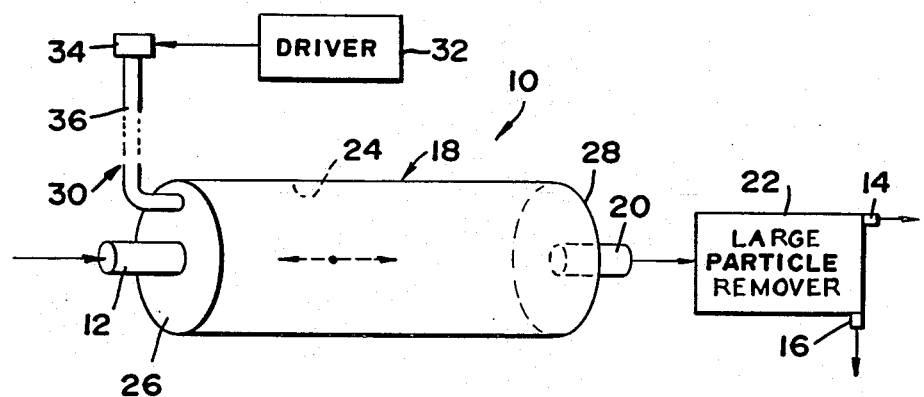
FIG. 1 is a simplified perspective view of acoustic agglomeration apparatus constructed in accordance with one embodiment of the present invention.
Figure 2:
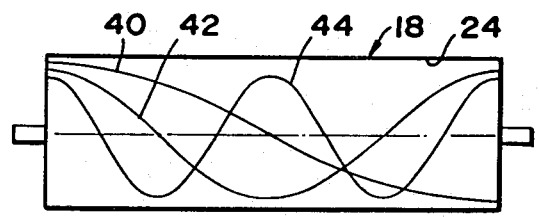
FIG. 2 is a partial simplified sectional view of the apparatus of FIG. 1.

FIGS. 1 and 2 illustrate a particle removal system 10 which has an inlet 12 that receives gas containing fine particles such as in the range of 0.5 micron to 5 micron. The system has a gas outlet 14 that discharges gas that is largely free of such particles, and a particle outlet 16 that discharges particulates removed from the gas. The system includes an agglomerator 18 which serves to bring the fine particles adjacent to one another so they stick together to form agglomerates of a size considerably larger than the size of the original particles, such as agglomerates of much more than 5 microns diameter. The agglomerator has an outlet 20 through which gas with the larger particles exits, to flow into a large particle removal apparatus 22. The apparatus 22 may be any of a variety of devices such as a venturi scrubber, cyclone, or fabric filter device, which is effective in separating out larger particles from gas. Such a device is also located upstream of the agglomerator inlet 12, so only fine particles pass into the agglomerator. Thus, the agglomerator 18 of the system functions as a preconditioner for a conventional dust collecting device, which agglomerates small particles to provide larger ones that can be efficiently removed by the removal apparatus 22.

The agglomerator 18 includes walls forming a chamber 24 of cylindrical cross section, and with largely flat end walls 26, 28. A sonic energy generator 30 is coupled to the chamber 24 to apply acoustic energy to the chamber. The energy generator includes a driver 32 which generates electrical signals of closely controlled frequencies, a sonic transducer 34 which converts the electrical signals to sonic energy, and a tube 36 which couples the transducer to an end of the chamber. The driver 32 is controlled to produce signals of frequencies that create sound waves of particular wavelengths within the chamber 24, with the wavelengths being chosen so that they correspond to an acoustic resonant mode of the chamber. In the system of FIGS. 1 and 2, sonic energy is directed along the length of the chamber, which is the distance between its end walls 26, 28, to produce acoustic standing wave patterns along the length of the chamber.

FIG. 2 illustrates three different wavelengths 40, 42, and 44, produced by the sonic generator 30, that are resonant to the length of the chamber. The wave 40 is the lowest resonant mode wherein the wavelength is twice the length of the chamber. The wave 42 is the second lowest mode, while the wave 44 is the fourth lowest mode along the length of the chamber. The function of the sonic energy is to vibrate particles suspended in the gas lying in the chamber, so that moving particles are drawn against one another to stick together. The particles are most likely to stick together when they are close but are not moving at a fast relative speed. The efficiency of the apparatus depends upon how effective the acoustic energy is in moving the particles to be agglomerated. The optimum acoustic frequency for vibrating a particle will increase with decreasing particle size. For particles of a range of size of 0.5 to 5 microns diameter, effective agglomeration frequencies range from about 20 kHz to about 0.5 kHz. Since the optimum frequency for particles in a range such as 0.5 micron to 5 micron diameter, varies so widely, the use of a plurality of different frequencies in the chamber 24 will more effectively vibrate particles of a range of sizes. The use of a plurality of frequencies will also enhance the agglomeration process as the coagulated particles grow during their movement along the chamber.

Figure 3:
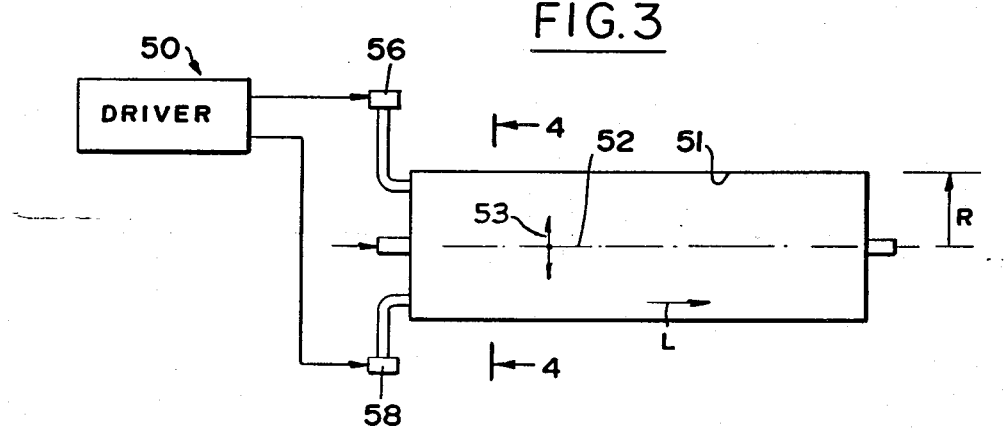
FIG. 3 is a simplified sectional side view of an agglomerator constructed in accordance with another embodiment of the invention.
Figure 4:
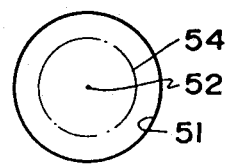
FIG. 4 is a view taken on the line 4—4 of FIG. 3.

FIG. 3 illustrates the system of FIG. 1, but with a sonic energy generator 50 constructed to generate acoustic wave patterns that extend across the width or diameter of the cylindrical chamber 51 along arrow 53, (i.e. the acoustic force does not depend on position along the length of the chamber). To create a standing wave pattern of the lowest mode that has no component along the length direction L of the cylindrical chamber, the wavelength that is applied is 3.41 R, where R is the chamber radius. Two higher modes, which are pure radial modes and therefore are of particular interest, have wavelengths of 1.64 R and 0.896 R, respectively. The lowest mode, of wavelength 3.41 R, provides an accoustic force that directs particles to the axis 52 of the cylinder. The lowest pure radial mode, of a wavelength of 1.64 R, provides a force that directs particles to the circle 54 (FIG. 4) independent of their position along the chamber. The second lowest pure radial mode of wavelength 0.896 R has two cylindrically shaped walls. The pure radial modes usually have a much higher Q than the lowest cylindrical mode or the modes shown in FIG. 2 along the length direction of the cylinder. The Q is a measure of the ratio between the frequency of a resonant mode and the width of the frequency band within which the intensity is within 3 db of the intensity obtained at the center of the band.

The use of modes transverse to the length of the chamber and to the flow of gas along the length of the chamber, has several advantages. One advantage is that the chamber 24 typically has a much smaller width or diameter than its length, so that high frequency acoustic standing wave patterns can be effectively propagated along the transverse direction. A second advantage is that the transverse standing wave patterns have force wells, (e.g. at 52 and 54) where the forces on the particles are lowest and to which the particles move, wherein the force wells are at a constant position relative to the center line 52 of the flow of gas and particles.

The particles not only vibrate to produce encounters that cause them to agglomerate, but also tend to move towards the force wells. The velocity of particle movement toward the force wells will depend on particle size and density thus leading to relative motion between particles. This relative motion will further enhance agglomeration. For those particles that move close to a well, such as near the centerline 52 in the case of the lowest cylindrical mode, the particles tend to be more concentrated, which also provides more opportunities for particles to encounter one another and stick together. A further advantage, mentioned above, for chambers of cylindrical shape, is that high Q's can be obtained for waves propagated across the circular cross-section of the chamber, especially for the pure radial modes. Coupling of transducers such as 56, 58 to an end of the chamber, avoids holes at the circular portion of the chamber that would decrease the Q, without deleterious effects.

Figure 5:
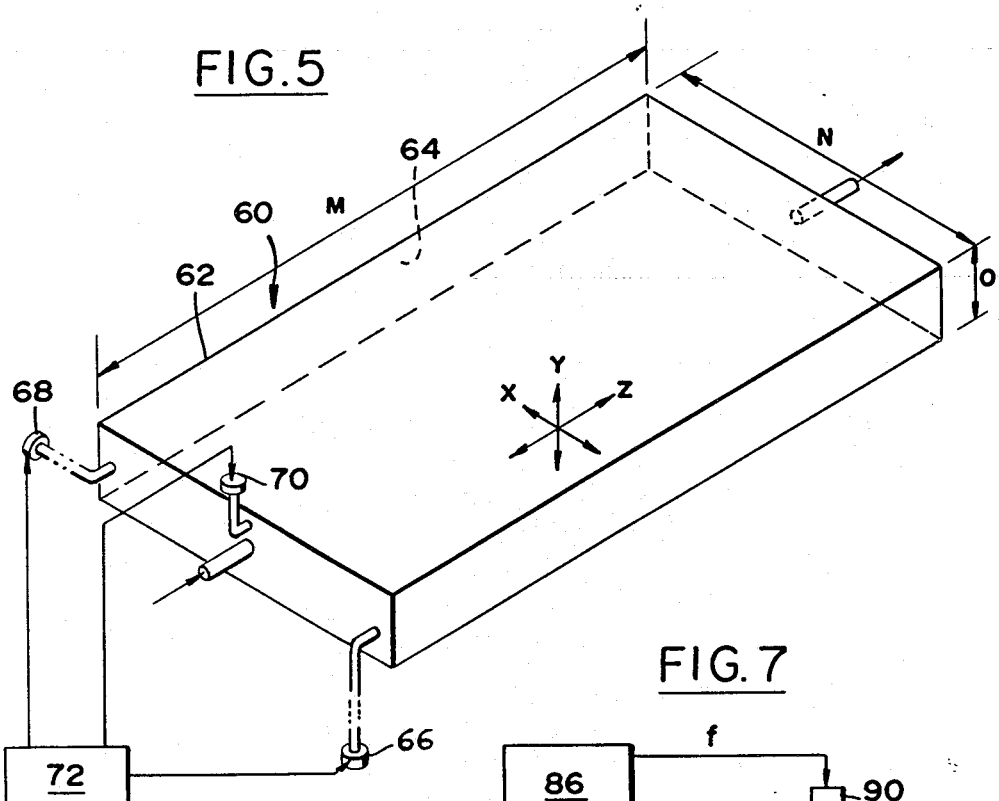
FIG. 5 is a simplified perspective view of an acoustic agglomerator constructed in accordance with another embodiment of the invention.

A wide range of resonant frequencies can be effectively applied by applying acoustic energy along two or more different dimensions of the chamber. FIG. 5 illustrates an agglomerator 60 which includes a housing 62 forming a chamber having a length M, width N, and height O that may be widely different. Three transducers 66–70 are driven by various drivers 72 to establish acoustic standing wave patterns in all three directions of the chamber. It may be noted that each transducer must be coupled to a chamber location where there is maximum, or at least a large, pressure in the standing wave pattern of the mode sustained by that transducer. Coupling to an end of the chamber, for transducers such as 68 and 70 which produce transverse standing waves, is done only for convenience.

The application of three mutually perpendicular standing wave patterns in chamber 64, permits the application of relatively low modes along each chamber dimension, while also providing frequencies over a wide range, by the excitation of higher modes, to efficiently oscillate particles ranging from 0.5 micron to 5 micron diameter. The particular chamber 64 is of rectangular cross section, so that plane waves can be propagated along each of the three chamber dimensions X, Y and Z. The application of acoustic waves along more than one direction, such as in the three directions in FIG. 5, produces greater particle movements to increase the likelihood of particles engaging one another to agglomerate, to agglomerate a higher proportion of the particles. In a rectangular chamber (and along the length direction of a cylindrical chamber) the harmonics of a wave propagated in any direction, will also be resonant to the chamber. Accordingly, the energy in such harmonics will also be present to vibrate particles.

Figure 7:
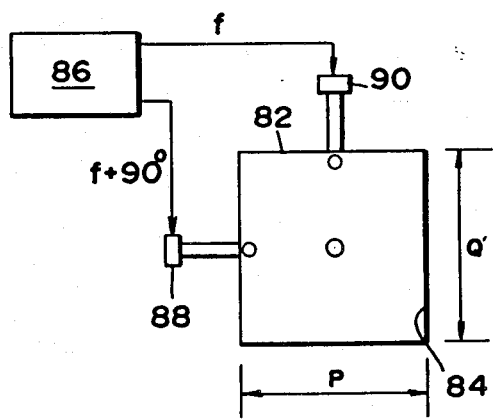
FIG. 7 is a view taken on the line 7—7 of FIG. 6.
Figure 8:
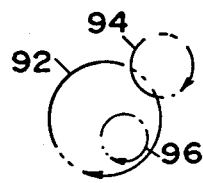
FIG. 8 is an enlarged view showing the nature of particle motion created in the apparatus of FIG. 7.
Figure 6:
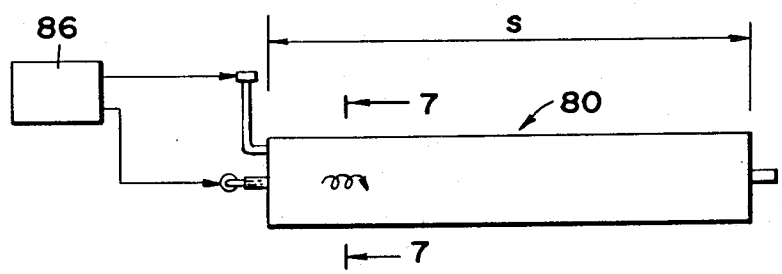
FIG. 6 is a simplified sectional view of an acoustic agglomerator constructed in accordance with another embodiment of the invention.

FIGS. 6–8 illustrate another agglomerator 80, which produces movement of particles in circles. This is accomplished by applying acoustic waves along perpendicular directions, to the gas flow in the chamber, where the acoustic waves are of the same wavelength but are out of phase. A 90° phase difference produces greatest rotary motion of the particles. This can be achieved by using a housing 82 with a chamber 84 of rectangular cross section, such as of square cross section, and by operating drivers 86 to drive two transducers at the same frequency but 90° out of phase. The application of transverse waves of the same wavelength but 90° out of phase has been utilized to rotate large objects. However, the use of the same technique in a chamber filled with gas in which small particles are suspended, results in the motion of such particles in circles to increase their opportunities to engage in one another to stick together. FIG. 8 shows the circular paths 92-96 of three different sized particles in the apparatus of FIG. 6, with the circular paths overlapping so there is a possibility for the particles to engage one another and agglomerate. Where the particles are moving parallel to the length S of the chamber, they actually move in helical paths. Modiification of the phase difference also may be used to produce relative motion between particle of different sizes, thereby increasing the probability of collision and agglomeration.

In practical applications, where particles are to be removed from a gas, an appreciable flow rate of gas must be accommodated. In one example where particulates are to be moved from the exhaust of a power plant, a gas flow of about 500 cubic feet per minute may have to be processed. The agglomerator may be of the type shown in FIG. 6, and may have a width and height P, Q' of two feet each and a length S of twelve feet. The gas flows through the chamber at a velocity of one foot per second, so the average duration in the chamber in about six seconds. Acoustic energy is directed in the chamber at an intensity of about 160 db.

In order to achieve appreciable particle movement and agglomeration, sound intensity of at least about 140 db (with reference to a level of $10^{-16}$ watts per square centimeter) must be applied. Higher intensities of up to about 160 db have been achieved using electrically driven transducers, but higher intensities require very large amounts of power and large transducers. Sirens can produce intensities of over 170 db, although they are more difficult to control. The time required to agglomerate particles in the range of 0.5 to 5 microns is typically less than 10 seconds. When the sound is applied for longer periods, a steady state condition is achieved at which the break up of particles occurs about as fast as particles are agglomerated, so no additional useful result is obtained.

Thus, the invention provides an effective method for removing fine particles on the order of 0.5 to 5 micron diameter, from a gas in which such particles are suspended. This is accomplished by first preconditioning the particles in a sonic agglomerator by the application of resonant acoustic waves to a chamber through which the gas with suspended particles moves, and thereafter passing the gas into a large particle remover to remove the agglomerated particles. The agglomerator includes walls forming a chamber, and one or more sonic energy generators that apply acoustic energy resonant to one or more modes of the chamber, to oscillate the particles while applying only moderate energy to the chamber to maintain one or more acoustic standing wave patterns. The standing wave patterns can be applied transverse to the movement of gas through the chamber and/or along the chamber length along which the gas moves. Two or more different standing wave patterns can be applied along the same or different directions to provide a wide range of frequencies to efficiently agglomerate particles of a wide range of sizes. In one apparatus acoustic waves of the same wavelength, but which are out of phase with one another, pass perpendicular to one another across the gas flow to move the particles in ellipses or circles as viewed in a cross section, or in helixes in other views.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for agglomerating particles suspended in a gas, comprising:

flowing said gas into a chamber; and simultaneously applying first and second acoustic energy of the same frequency, largely along perpendicular directions in said chamber, with each of said first and second energies being at resonant chamber modes and with said first and second energies being out of phase, to cause small particles to move in circle-like paths.

2. The method described in claim 1 wherein:

said step of flowing includes flowing said gas continuously through said chamber, and said first and second energies are each directed transverse to the direction of gas flow, whereby to move particles in a helix.

3. The method described in claim 1 wherein:

said first and second acoustic energies are maintained 90° out phase with each other.

4. A method for agglomerating particles suspended in a gas, comprising:

flowing said gas lengthwise along a chamber; and simultaneously applying acoustic energy of a wavelength that is resonant to each to two perpendicular dimensions of said chamber along said directions, including applying said energy in directions that are each substantially transverse to the flow of gas along the lengthwise dimension of said chamber;

the acoustic energy in said perpendicular directions being of the same frequency but about 90° out of phase.

* * * * *